(12) United States Patent
Silvester

(10) Patent No.: US 6,449,683 B1
(45) Date of Patent: Sep. 10, 2002

(54) USING NON-VOLATILE MEMORY FOR POWER MANAGEMENT IN A COMPUTER

(75) Inventor: Kelan Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,644

(22) Filed: Dec. 14, 1999

(51) Int. Cl.[7] .............................................. G06F 12/00
(52) U.S. Cl. ...................................... 711/103; 711/170
(58) Field of Search ................................ 711/103, 106, 711/114, 170, 6, 113, 162; 710/10, 267; 713/1, 2, 193, 323; 714/22, 36, 46, 48, 15, 21, 54, 51, 20; 324/142; 365/104, 185.33

(56) References Cited

U.S. PATENT DOCUMENTS

| | | | |
|---|---|---|---|
| 4,907,150 A | * 3/1990 | Arroyo et al. ............... 713/323 |
| 4,965,828 A | * 10/1990 | Ergott, Jr. et al. ........... 713/193 |
| 4,999,575 A | * 3/1991 | Germer ....................... 324/142 |
| 5,197,026 A | * 3/1993 | Butler ........................ 365/104 |
| 5,327,435 A | * 7/1994 | Warchol ...................... 714/36 |
| 5,450,576 A | * 9/1995 | Kennedy ....................... 713/2 |
| 5,519,831 A | * 5/1996 | Holzhammer ................. 714/22 |
| 5,519,832 A | * 5/1996 | Warchol ....................... 714/46 |
| 5,579,522 A | * 11/1996 | Christeson et al. ............. 713/2 |
| 5,586,291 A | * 12/1996 | Lasker et al. ................ 711/113 |
| 5,802,393 A | * 9/1998 | Begun et al. .................. 710/10 |
| 5,884,094 A | * 3/1999 | Begun et al. .................. 710/10 |
| 6,016,530 A | * 1/2000 | Auclair et al. ................ 711/6 |
| 6,038,689 A | * 3/2000 | Schmidt et al. ............... 714/48 |
| 6,098,158 A | * 8/2000 | Lay et al. ................... 711/162 |
| 6,104,638 A | * 8/2000 | Larnet et al. .......... 365/185.33 |
| 6,157,979 A | * 12/2000 | Barnett ....................... 710/267 |
| 6,209,088 B1 | * 3/2001 | Reneris ........................ 713/1 |
| 6,212,632 B1 | * 4/2001 | Surine et al. .................. 713/2 |

* cited by examiner

*Primary Examiner*—David Hudspeth
*Assistant Examiner*—Fred F. Tzeng
(74) *Attorney, Agent, or Firm*—Fish & Richardson P.C.

(57) ABSTRACT

A computer system includes a processor and a non-volatile memory device coupled to the processor. The processor either generates or receives a command to enter a low-power mode. The non-volatile memory device includes a first area reserved for random-access read/write cycles by the processor and a second area reserved for storing processor state information upon entering the low-power mode. The processor and the memory device both are configured to lose power during the low-power mode. In some embodiments, the memory device also serves as a read-only memory device and as a persistent storage device for data and application programs.

19 Claims, 3 Drawing Sheets

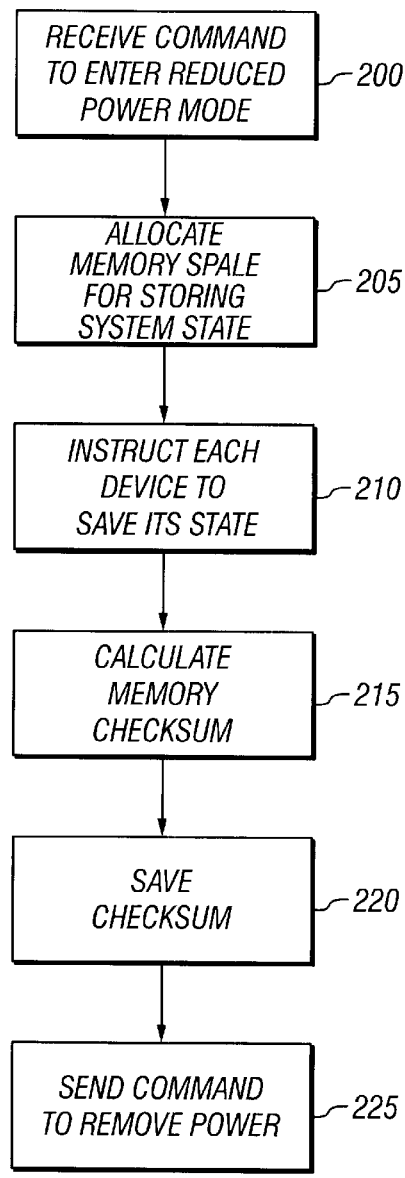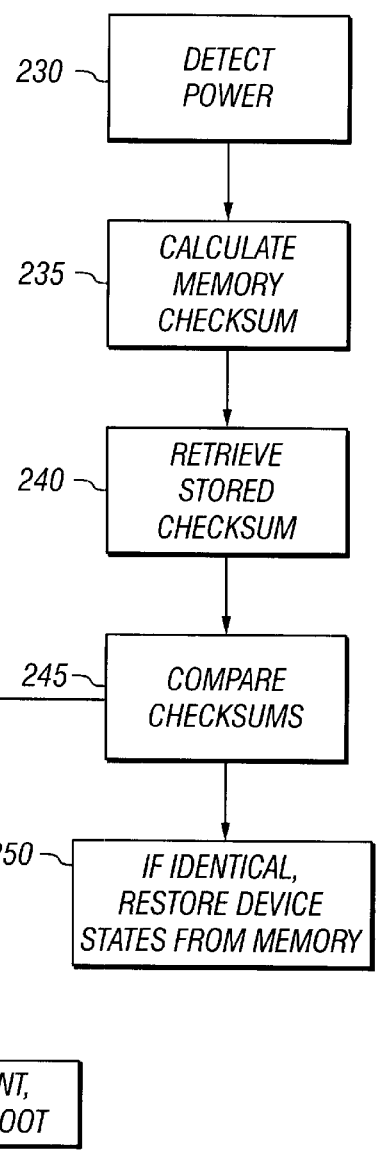
FIG. 3
FIG. 4

USING NON-VOLATILE MEMORY FOR POWER MANAGEMENT IN A COMPUTER

TECHNICAL FIELD

The invention relates to power management in a computer system.

BACKGROUND

Power management has become very important in the computer industry, particularly for portable computers, such as laptop units. The industry has developed several power management standards, including the Advanced Power Management (APM) Specification, version 1.2, published by Intel Corporation and Microsoft Corporation in February 1996, and the Advanced Configuration and Power Interface (ACPI) Specification, version 1.0, published in February 1998 by Intel Corporation, Microsoft Corporation and Toshiba K.K. The ACPI Specification, for example, defines several reduced-power states for a computer system, including the "S3", or "Suspend-to-RAM", state and the "S4", or "Suspend-to-Disk", state.

In the ACPI S3 state, the computer removes power from many of its components, including the processor. The states of the processor and other devices in the computer are saved to memory before power is removed. The memory subsystem is powered to retain device and system information. In the S4 state, the computer removes power from all devices, including memory, except for certain devices, such as modems and network interface cards, that must remain powered to recognize signals from external sources. The state of the computer system is saved to a non-volatile, rotating storage device, such as a hard disk, before power is removed.

The S4 state produces more aggressive power savings than the S3 state because the computer does not continue to supply power to system memory. As a trade off, more time is needed to exit the S4 state because the system state information must be restored from a rotating storage medium, for which access time is much greater than the access time associated with random-access memory devices;

A new non-volatile, random-access memory type, known as ferromagnetic or ferroelectric memory, has been developed. Ferromagnetic memory is truly non-volatile in that it retains data for a very long time, i.e., several months or longer, after losing power.

SUMMARY

A computer system includes a processor and a non-volatile random-access memory device, such as a ferromagnetic memory device, coupled to the processor. The processor either generates or receives a command to enter a low-power mode. The non-volatile memory device includes a first area reserved for random-access read/write cycles by the processor and a second area reserved for storing processor state information upon entering the low-power mode. The processor and the memory device both are configured to lose power during the low-power mode. In some embodiments, the memory device also serves as a read-only memory device and as a persistent storage device for data and application programs.

Other embodiments and advantages will become apparent from the description and claims that follow.

DESCRIPTION OF THE DRAWINGS

FIGS. 3 and 4 are flow charts illustrating techniques for using non-volatile, random-access memory in supporting a reduced-power mode in a computer system.

DETAILED DESCRIPTION

Figure 1:
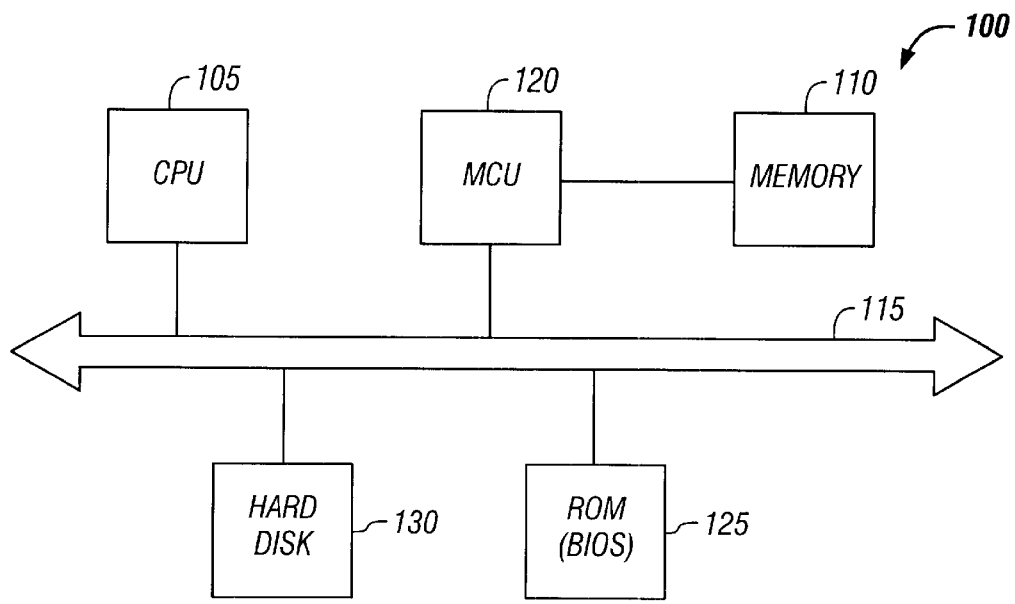
FIG. 1 is block diagram of a conventional computer system.

FIG. 1 shows a conventional computer system 100. The computer 100 includes a processor 105 and a conventional volatile memory device 110, such standard dynamic random access memory (DRAM). The processor 105 and the memory device 110 are coupled by a data bus 115. A memory control unit (MCU) 120 controls the flow of data into and out of the memory device 110.

The computer also includes one or more non-volatile storage devices, such as a read-only memory (ROM) device 125 and a hard disk 130. One function of the ROM device 125 is storing the program code that the processor 105 uses to implement the computer's binary input/output system (BIOS).

Figure 2:
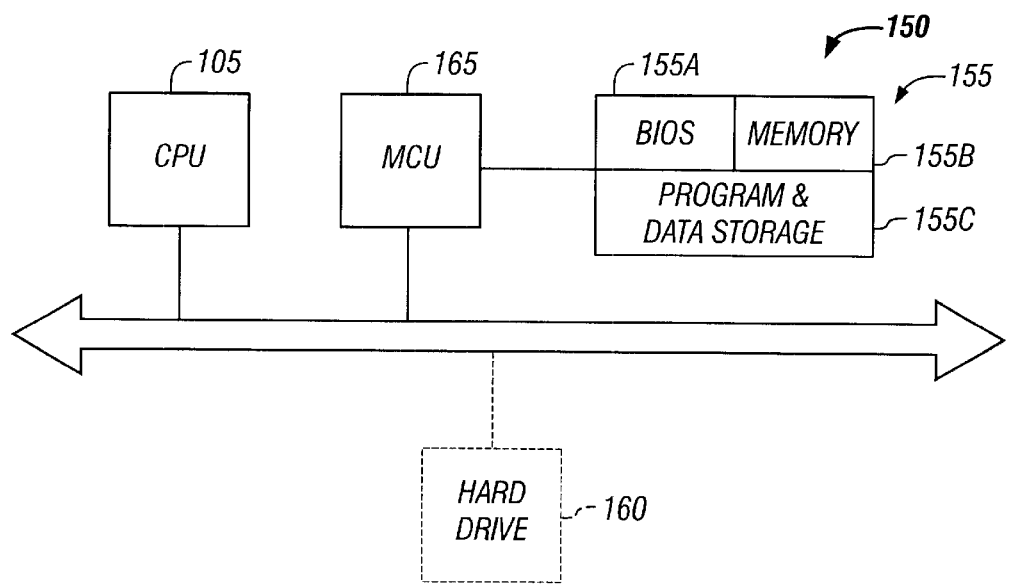
FIG. 2 is a block diagram of a computer system having nonvolatile, dynamic memory.

FIG. 2 shows a computer system 150 that uses a non-volatile, random-access memory device, such as a ferromagnetic memory device 155. The ferromagnetic memory device 155 has at least one storage area 155A dedicated to replacing the standard volatile, dynamic memory device 110 and at least one other storage area 155B dedicated to replacing the standard non-volatile, read-only memory device 125 of the conventional computer system 100. The ferromagnetic memory device 155 can also include at least one storage area 155C dedicated to the persistent storage of data and programs typically found on the hard disk 130 of the conventional computer system 100. In some of these embodiments, the computer system 150 also includes a hard disk 160 to store some or all of these programs and data.

The ferromagnetic memory device 155 is able to retain its memory state for a long time, e.g. months, after losing power. Hence, this does not require memory refresh cycles like conventional memory devices. Therefore, the memory control unit 165 of FIG. 2, unlike the conventional MCU 120 of FIG. 1, does not need to perform memory refresh cycles. The non-volatility of the ferromagnetic memory device 155allows it to perform the functions of conventional non-volatile and persistent storage devices. However, like conventional DRAM, and unlike conventional non-volatile and persistent storage devices, the ferromagnetic memory device 155 is capable of nanosecond random-access read/write cycles. Therefore, the ferromagnetic memory device can be used to implement conventional DRAM as well.

Several advantages result from using ferromagnetic memory in the computer system 150. The ferromagnetic memory device 155 allows the computer system 150 to support a single low-power mode, in which power is removed from almost all system components, including system memory. The states of various system devices, including the processor 105, are stored to the ferromagnetic memory device 155, instead of to a rotating storage device, just before entering the low-power mode. Because the ferromagnetic memory device 155 is truly non-volatile, the computer system 150 can remove power from the to ferromagnetic memory device 155 during this low-power mode and thus can achieve the power savings associated with the ACPI S4 sleep state. On the other hand, because the ferromagnetic memory device 155 supports nanosecond random-access read/write cycles, the time required for the computer system 150 to exit the low-power mode and resume normal operation is as short as or shorter than the recovery time associated with the ACPI S3 sleep state. In some embodiments, this low-power mode also replaces the conventional screen-saver mode, in which the conventional computer system shuts off its display screen after a period of inactivity.

Another advantage of using ferromagnetic memory in the computer system is improved boot performance. In general, the computer must undergo the boot process only once, unless a power outage or system failure shuts the system down unexpectedly. Any scheduled removal of power after the initial boot process is treated as entry into the low-power mode, and system state information is preserved in the ferromagnetic memory device. As a result, the computer system exhibits true "instant-on" capabilities.

FIG. 3 illustrates a sequence for use in placing the computer system 150 in the low-power mode. Upon receiving or generating a command to enter the low-power mode (step 200), the processor 105 allocates space in the ferromagnetic memory device 155 for storing the operating states of system devices (step 205). The operating states graphics controllers, system timers, interrupt controllers, input devices such as keyboards and mice, device connectors, storage devices such as IDE, SCSI, CD-ROM, DVD, and floppy drives, audio subsystems, modem and LAN connections, processors, and system chipsets can be stored, as well as others. The processor instructs each of these devices to store its state or configuration data to the allocated space in memory (step 210).

Once the device states are stored to memory, the processor calculates a checksum for the memory device (step 215) and stores the checksum at a specified location in the memory device (220). The processor then asserts a command signal that instructs the computer system to enter the low-power mode (step 225).

FIG. 4 illustrates a sequence for use in restoring the computer system to normal operation upon exiting the low-power mode. Upon detecting the restoration of power (step 230), the processor calculates a checksum for the memory device (step 235). The processor then retrieves the checksum stored at the specified location in memory upon entering the low-cower mode (step 240). The processor compares the two checksum values (step 245). If the values match, the processor restores the device states from the allocated space in memory (step 250) and then resumes normal operation.

For those embodiments in which the ferromagnetic memory device 155 includes a read-only portion that implements the computer's binary input/output system (BIOS), the memory control unit 165 is designed to restrict access to this portion of memory. The MCU 165 is configured to lock and unlock the read-only portion of memory only upon receiving an appropriate password from the device requesting access to this portion of memory. In some embodiments, the MCU 165 permanently locks the protected portion of memory upon receiving several invalid attempts at accessing this portion of memory, as described below. This feature shields the protected portion of memory against virus software designed to try all possible password combinations. In some embodiments, the MCU 165 requires two or more successive valid requests before unlocking the protected portion of memory.

Figure 5:
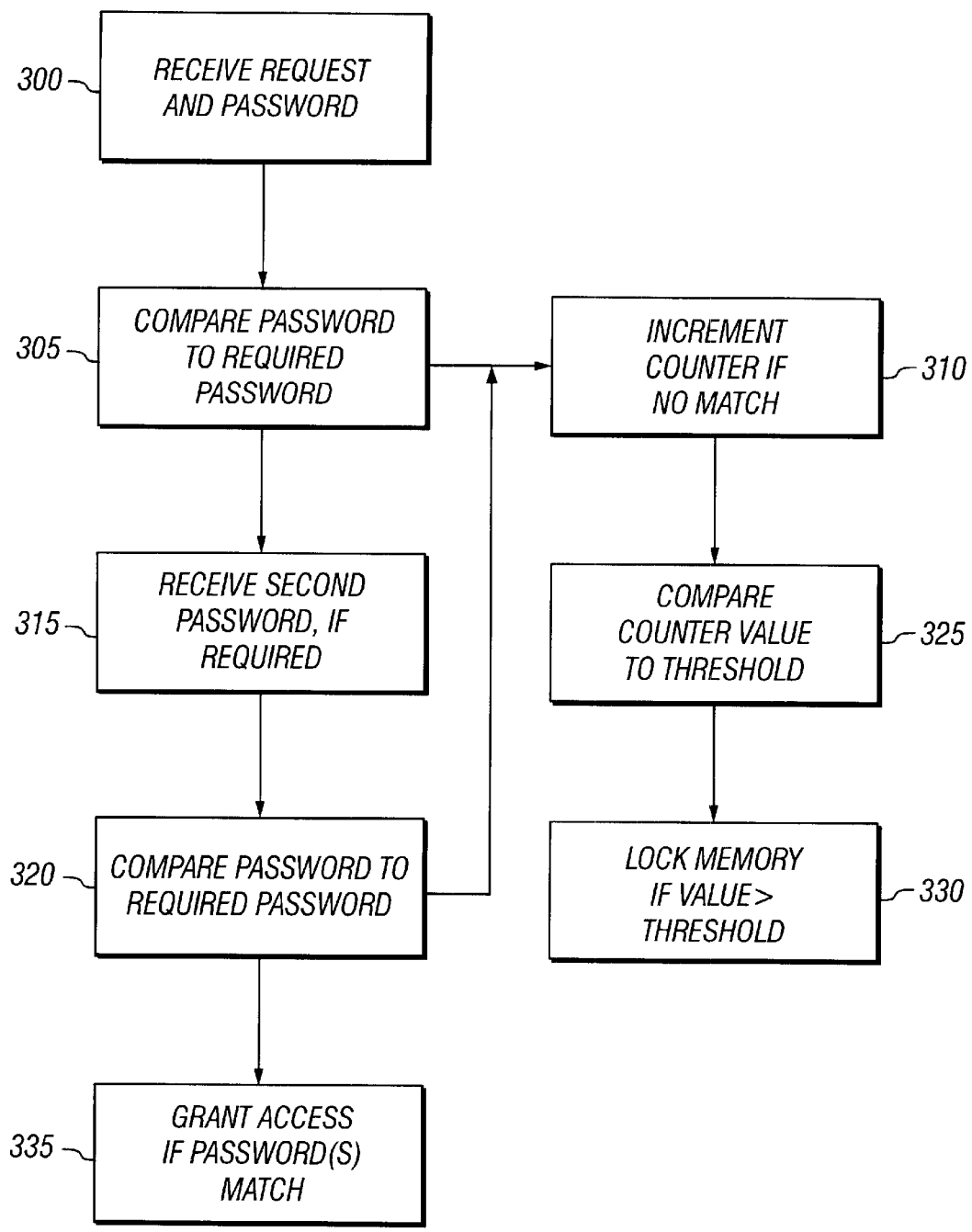
FIG. 5 is a flow chart illustrating a technique for ensuring the integrity of a protected portion of a non-volatile memory device.

FIG. 5 shows one technique for ensuring the integrity of the protected portion 155A of the ferromagnetic memory device 155. Upon receiving a request for access to the protected portion and a corresponding password (step 300), the MCU 165 compares the received password with the required password (step 305). If the passwords do not match, the MCU 165 increments a counter that indicates the number of unsuccessful attempts (step 310). If the passwords match and a second consecutive password is required, the MCU waits for the second password. Upon receiving the second password (step 315), the MCU compares the password to the required password (step 320). If the passwords do not match, the MCU increments the counter (step 315).

After receiving an invalid password and incrementing the counter, the MCU compares the value in the counter to a predetermined threshold value (step 325). The MCU locks down the protected portion of memory if the counter value equals or exceeds the threshold value (step 330). In many embodiments, memory remains locked until the user powers off the computer and reboots. If, on the other hand, the MCU receives a valid password combination, the NCU grants access to the protected portion of memory (step 335).

A number of embodiments have been described. Nevertheless, one of ordinary skill will understand that variations are possible. For example, in some embodiments, the MCU is able to alter the size of the protected portion of memory dynamically. This differs from a traditional ROM device, which is fixed in size and must be replaced by a larger or smaller device to alter the amount available read-only memory. Moreover, non-volatile, random access memory can be used in the manner described and claimed here with any processor, chipset, and platform. Accordingly, other embodiments are within the scope of the following claims.

What is claimed is:

1. A computer system comprising:
    a processor; and
    a non-volatile memory block coupled to the processor to allow access by said processor, and comprising only ferromagnetic memory having:
        a first area reserved for random-access read/write cycles by the processor; and
        a second area reserved for read-only access by the processor.

2. The system of claim 1, wherein the second area includes program code implementing a binary input/output system (BIOS) for the computer system.

3. The system of claim 1, wherein the non-volatile memory block further comprises a third area reserved for storage of data and application programs that persists during power outage.

4. The system of claim 1, further comprising a memory controller configured to execute no memory refresh cycles on the memory block.

5. The system of claim 1, where the memory block includes an area assigned to store processor state information upon entering a low-power mode.

6. The system of claim 5, where the memory block also includes an area assigned to store state information for other system devices upon entering the low-power mode.

7. A method for use in a computer system having a processor and a memory block comprising only ferromagnetic memory, the method comprising:
    granting the processor access to a first area in the memory block during random access read/write cycles;
    receiving an access password;
    comparing the access password to a required password; and if the access password matches the required password, granting the processor access to a second area in the memory block during read-only cycles.

8. The method of claim 7, further comprising storing program code in the second area, where the program code, when executed by the processor, implements a binary input/output system (BIOS) for the computer.

9. The method of claim 7, further comprising using a third area of the memory block for persistent storage of data and application programs.

10. The method of claim 7, further comprising operating the memory block with no memory refresh cycles.

11. The method of claim 7, further comprising storing processor state information in an assigned area upon entering a low-power mode.

12. The method of claim 11, further comprising storing state information for other system devices in another assigned area upon entering the low-power mode.

13. A method for use in implementing a low-power mode in a computer system, the method comprising:

receiving a command to enter the low-power mode;

password locking a read-only portion of ferromagnetic storing processor state information in a read/write portion of the ferromagnetic memory; and after said receiving and said storing, removing power from both the processor and the ferromagnetic memory.

14. The method of claim 13, further comprising restoring power to the processor and the ferromagnetic memory and, thereafter, retrieving the processor state information from the ferromagnetic memory and restoring the processor to a state preserved in the processor state information.

15. The method of claim 13, further comprising generating the command when the processor has been idle for a period of a predetermined length.

16. The method of claim 13, further comprising storing state information for other system devices in the ferromagnetic memory before removing power.

17. A computer system comprising:

a processor configured to generate or receive a command to enter a low-power mode, the processor not including non-volatile memory; and a ferromagnetic memory device coupled to the processor, comprising:

a first area reserved for random-access read/write cycles by the processor; and a second area reserved for storing processor state information upon entering the low-power mode;

where the processor and the ferromagnetic memory device are both configured to lose power during the low-power mode.

18. The system of claim 17, where the memory device also includes a storage area reserved for storing state information for other system devices upon entering the low-power mode.

19. The system of claim 17, further comprising a memory controller configured to execute no memory refresh cycles on the memory device.

* * * * *